United States Patent
Liu et al.

(10) Patent No.: US 10,212,410 B2
(45) Date of Patent: Feb. 19, 2019

(54) SYSTEMS AND METHODS OF FUSING MULTI-ANGLE VIEW HD IMAGES BASED ON EPIPOLAR GEOMETRY AND MATRIX COMPLETION

(71) Applicant: Mitsubishi Electric Research Laboratories, Inc., Cambridge, MA (US)

(72) Inventors: Dehong Liu, Lexington, MA (US); Yanting Ma, Raleigh, NC (US); Hassan Mansour, Boston, MA (US); Ulugbek Kamilov, Cambridge, MA (US); Yuichi Taguchi, Arlington, MA (US); Petros Boufounos, Winchester, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 232 days.

(21) Appl. No.: 15/386,187

(22) Filed: Dec. 21, 2016

(65) Prior Publication Data
US 2018/0176531 A1    Jun. 21, 2018

(51) Int. Cl.
*H04N 13/00*    (2018.01)
*H04N 13/156*    (2018.01)
(Continued)

(52) U.S. Cl.
CPC ............ *H04N 13/156* (2018.05); *G06T 1/00* (2013.01); *H04N 5/2628* (2013.01); *H04N 13/204* (2018.05)

(58) Field of Classification Search
None
See application file for complete search history.

(56) References Cited

U.S. PATENT DOCUMENTS 8,487,981 B2 * 7/2013 Hulyalkar ............ H04N 13/139
                                                            348/42
9,007,460 B2 * 4/2015 Schmidt ................... H04N 7/18
                                                          348/143
(Continued)

OTHER PUBLICATIONS

A. Maalouf, P. Carre, B. Augereau, and C. Fernandez-Maloigne, "A bandelet-based inpainting technique for clouds removal from remotely sensed images," IEEE transactions on geoscience and remote sensing, vol. 47, No. 7, pp. 2363-2371, 2009.
(Continued)

*Primary Examiner* — Christopher G Findley
(74) *Attorney, Agent, or Firm* — Gene Vinokur; James McAleenan; Hironori Tsukamoto

(57) ABSTRACT

Systems and methods for image processing including a memory having stored multi-angled view images of a scene. Each multi-angled view image includes pixels, and at least one multi-angled view image includes a clouded area in the scene, resulting in missing pixels. A processor configured to align three multi-angled view images in the multi-angled view images to a target view angle of the scene, to form a set of aligned multi-angled view images representing a target point of view of the scene, at least one aligned multi-angled view image of the at least three multi-angled view images, has missing pixels due to the clouded area. Form a matrix using vectorized aligned multi-angled view images, wherein the matrix is incomplete due to the missing pixels. Complete the matrix using a matrix completion to combine the aligned multi-angled view images to produce a fused image of the scene without the clouded area.

20 Claims, 7 Drawing Sheets

(51) Int. Cl.
  H04N 13/204 (2018.01)
  G06T 1/00 (2006.01)
  H04N 5/262 (2006.01)

(56) References Cited

U.S. PATENT DOCUMENTS

| | | | | |
|---|---|---|---|---|
| 2005/0074162 A1* | 4/2005 | Tu | ............. | G06T 7/80 |
| | | | | 382/154 |
| 2005/0231505 A1* | 10/2005 | Kaye | ............. | G06T 7/97 |
| | | | | 345/421 |
| 2005/0232509 A1* | 10/2005 | Blake | ............. | G06K 9/03 |
| | | | | 382/275 |
| 2011/0115790 A1* | 5/2011 | Yoo | ............. | H04N 13/0022 |
| | | | | 345/419 |
| 2013/0129193 A1* | 5/2013 | Wang | ............. | G06K 9/00208 |
| | | | | 382/154 |
| 2014/0022453 A1* | 1/2014 | Slutsky | ............. | H04N 5/145 |
| | | | | 348/441 |
| 2016/0055650 A1* | 2/2016 | Park | ............. | G06T 19/20 |
| | | | | 382/131 |

OTHER PUBLICATIONS

L. Lorenzi, F. Melgani, and G. Mercier, "Inpainting strategies for reconstruction of missing data in vhr images," IEEE Geoscience and remote sensing letters, vol. 8, No. 5, pp. 914-918, 2011.
C-H. Lin, P.-H. Tsai, K.-H. Lai, and J.-Y. Chen, "Cloud removal from multitemporal satellite images using information cloning," IEEE transactions on geoscience and remote sensing, vol. 51, No. 1, pp. 232-241, 2013.
A. Aravkin, S. Becker, V. Cevher, and P. Olsen, "A variational approach to stable principal component pursuit," UAI Proceedings 2014, 2014.
L. Lorenzi, F. Melgani, and G. Mercier, "Missing-area reconstruction in multispectral images under a compressive sensing perspective," IEEE transactions on geoscience and remote sensing, vol. 51, No. 7, pp. 3998-4008, 2013.
J. Wang, P. A. Olsen, A. R. Conn, and A. C. Lozano, "Removing clouds and recovering ground observations in satellite image sequences via temporally contiguous robust matrix completion," arXiv preprint arXiv:1604.03915, 2016.
Z. Zhang, D. Liu, S. Aeron, and A. Vetro, "An online tensor robust PCA algorithm for sequential 2D data," in Pro. IEEE Int. Conf. Acoustics, Speech and Signal Processing (ICASSP), pp. 2434-2438, 2016.
D. G. Lowe, "Object recognition from local scale-invariant features," in Proc. 6th IEEE int. Cont Computer vision, vol. 2, pp. 1150-1157, 1999.
J.-F. Cai, E. J. Cand'es, and Z. Shen, "A singular value thresholding algorithm for matrix completion," SIAM Journal on Optimization, vol. 20, pp. 1956-1982, May 2010.
L. I. Rudin, S. Osher, and E. Fatemi, "Nonlinear total variation based noise removal algorithms," Physica D, vol. 60, pp. 259-268, 1992.
P. F. Felzenszwalb and D. P. Huttenlocher, "Efficient belief propagation for early vision," International journal of computer vision, vol. 70, No. 1, pp. 41-54, 2006.
M. A. Fischler and R. C. Bolles, "Random sample consensus: a paradigm for model fitting with applications to image analysis and automated cartography," Communications of the ACM, vol. 24, No. 6, pp. 381-395, 1981.
E. J. Cand'es and B. Recht, "Exact matrix completion via convex optimization," Foundations of Computational mathematics, vol. 9, No. 6, pp. 717-772, 2009.
R. Chartrand, "Nonconvex splitting for regularized low-rank+ sparse decomposition," IEEE Trans. Signal Process., vol. 60, No. 11, pp. 5810-5819, 2012.
K.-C. Toh and S. Yun, "An accelerated proximal gradient algorithm for nuclear norm regularized linear least squares problems," 'Pacific Journal of Optimization, vol. 6, No. 15, pp. 615-640, 2010.
A. Beck and M. Teboulle, "A fast iterative shrinkagethresholding algorithm for linear inverse problems," SIAM journal on imaging sciences, vol. 2, No. 1, pp. 183-202, 2009.

* cited by examiner

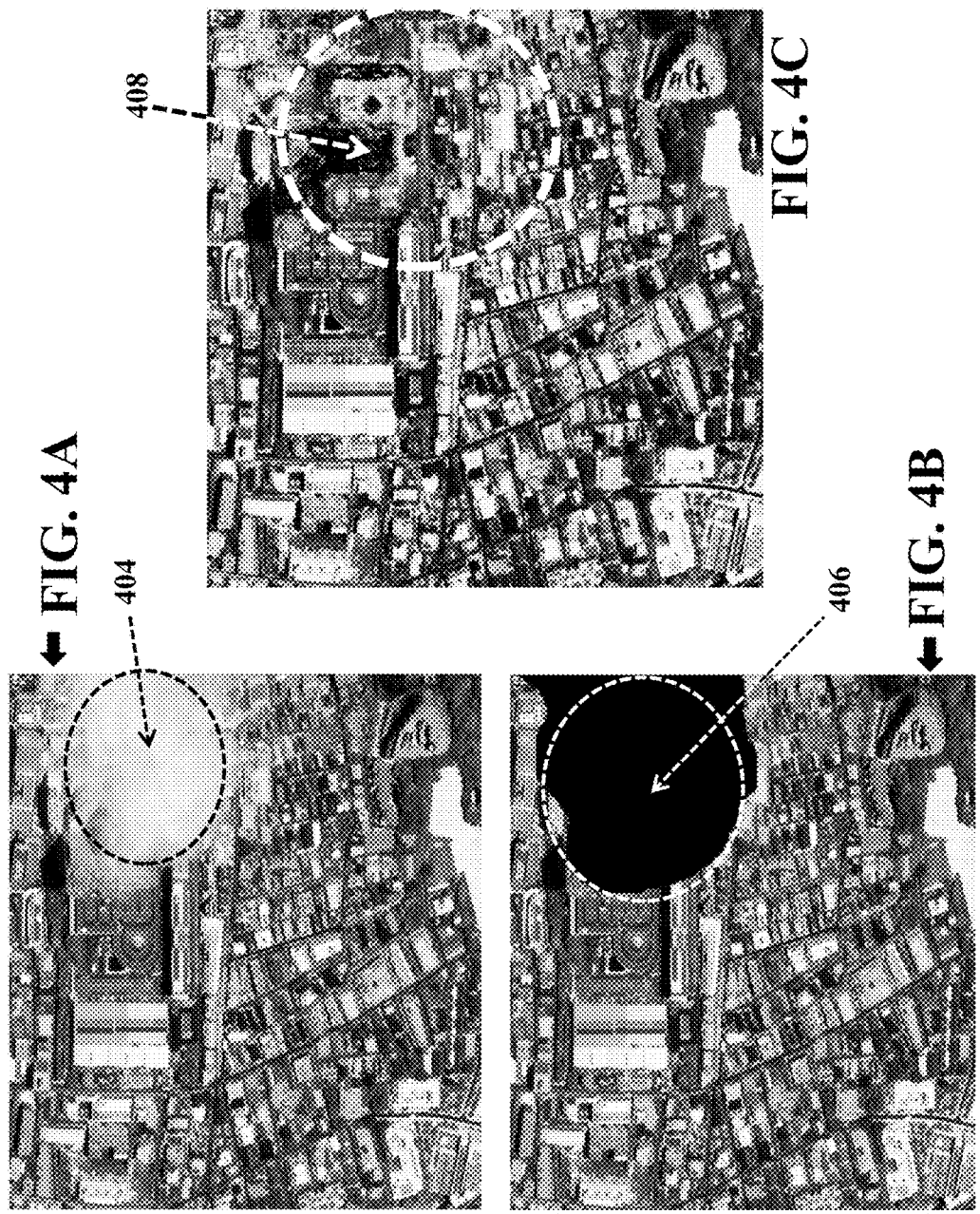

SYSTEMS AND METHODS OF FUSING MULTI-ANGLE VIEW HD IMAGES BASED ON EPIPOLAR GEOMETRY AND MATRIX COMPLETION

FIELD

The present disclosure relates generally to imaging processing, and more particularly to fusing multiple cloud contaminated high definition (HD) aerial images of a three dimensional (3D) scene to generate a cloud-free HD image.

BACKGROUND

A common problem in aerial photography is that the acquired optical aerial images are contaminated by clouds obscuring the view. Specifically, clouds can be a fatal problem in optical images, and especially limits image interpretability. For example, clouds hinder the usability of the images in applications such as urban planning and environmental monitoring. Due to the high cost of aerial image acquisition, it is desirable to generate cloud free images by fusing multiple cloud-contaminated images captured at different time or from different view angles.

Conventional cloud removal methods assume that the images are well-aligned and do not take parallax into consideration, even when those images are captured from different view angles. However, the present disclosure has observed that slight misalignment has a significant effect on high definition (HD) images, and can lead to significant blurring in HD images. This can be especially true for urban areas where buildings exhibit different elevation.

Therefore, to meet the requirements of modern HD image applications, the present disclosure is addressing the need to develop fusion algorithms suitable for HD images of three dimensional (3D) scenes.

SUMMARY

The present disclosure relates to fusing multiple cloud contaminated high definition (HD) aerial images of a three dimensional (3D) scene to generate a cloud-free HD image. Specifically, fusing a collection of mis-aligned HD images, such as multi-angle view HD images with unknown camera positions.

Embodiments of present disclosure are based on an image fusion algorithmic framework for HD images incorporating epipolar geometry and matrix completion techniques. Such that upon the acquiring images of the scene, the acquired images are warped or aligned to a view angle of a target image based on an estimated epipolar geometry. Epipolar geometry can fundamentally be explained as the geometry of stereo vision. For example, when two cameras view a 3D scene from two distinct positions, there are a number of geometric relations between the 3D points and their projections onto the two dimensional (2D) images that lead to constraints between the image points. These relations can be derived based on the assumption that the cameras can be approximated by the pinhole camera model. Then, the image fusion process can be formulated as a low-rank matrix completion problem, such that each column of the matrix corresponds to a vectorized warped image and missing entries correspond to cloud or occluded areas to be recovered. Note, clouded areas or cloud contaminated images are incomplete images due to areas of cloud-cover blocking the full view of image of the scene by the camera. Further a low-rank matrix completion problem can be used to complete a matrix with missing entries by assuming the matrix has a low rank, which can be solved as a constraint optimization problem.

The present disclosure is based on a realization that before fusing the high-resolution images, the cloud-contaminated images need to be aligned (warped) to the same view angle, like all images are taken from the same location. At least one reason this is important is because the present disclosure avoids the high cost of aerial image acquisition of conventional imaging methods. The present disclosure fuses multiple cloud-contaminated images from images that are captured either at different times and/or captured from different view angles. Specifically, convention image reconstruction methods assume that the acquired cloud-contaminated images are well-aligned and do not take parallax into consideration, even when those images are captured from different view angles. Parallax can be understood as the effect whereby the position or direction of an object appears to differ when viewed from different positions, e.g., through the viewfinder and the lens of a camera.

The present disclosure is also based on another realization that warping of images taken from different angles can lead to incomplete images. For example, an image taken from behind of a building and warped to a view from a front of the building will miss some pixels visible only from the front. In addition, some pixels will be missed due to cloud contamination of the view. The missing pixels hinders the usability of the images in modern applications, such as urban planning and environmental monitoring, among other applications, rendering them unusable or unable to provide a suitable solution. We discovered through experimentation that a slight misalignment will have a significant effect on high definition (HD) images and leads to significant blurring in HD images. We also learned through experimentation that this is especially true for urban areas where buildings exhibit different elevations. Further, in order to meet the requirements of modern HD image applications, including urban planning and environmental monitoring, as mentioned above, the present disclosure addresses the essential need to develop fusion systems and methods suitable for HD images of 3D scenes.

The present disclosure further discovered or realized that the matrix formed by the vectorized warped images will be a low rank due to the similarity of at least some pixels in the images. To vectorize the warped images, we put the magnitude value each pixel one by one in a vector. The order of pixels can be row by row, column by column, or any other kind as long as the order is the same across all images. By assuming low rank, rank 2 for example, we may find a small number 2, of independent vectors of images, which can be used to represent all vectors of warped images. The low rank constraint is beneficial in fusing information across all images viewed from different angles. Thus, the missing pixels can be recovered using a low-rank matrix completion method. At least one key aspect of the present disclosure is recovering a cloud free image using the matrix completion of a matrix formed by vectorized cloud contaminated images warped to the same view angle, among other key aspects.

To better understand how the methods and systems of the present disclosure can be implemented, at least one approach includes having at least three phases: cloud detection, image warping and image fusion. It is contemplated other phases may be incorporated depending upon the specific application.

After acquiring multi-angle view cloud contaminated images (step 1), then cloud detection is initiated. Cloud detection (step 2) can be performed based on the intensity and total variation of small patches.

Image warping (step 3) can be achieved by SIFT-flow with a geometric distance regularizer (i.e. key point SIFT feature matching-step 3a), followed by epipolar point transfer. Specifically, the present disclosure may use an approach of estimating fundamental matrices (i.e. fundamental matrix estimation-step 3b), between all pairs of images from the cloud-free areas, and then finds dense correspondence points of all image pairs by applying SIFT-flow constrained to the epipolar geometry of the scene (i.e. epipolar geometry regularized SIFT-flow-step 3c). Once a target image, a cloud-contaminated image to be recovered, can be determined (i.e. occlusion detection-step 3d), all other images are warped to the same view angle of the target image by a point transfer formula (i.e. point transfer-step 3e), such that they are aligned with each other.

After image warping, we have obtained a collection of images that are warped to align with the target image. The warped images contain missing pixels due to cloud contamination or occlusion. Such that, image fusion can be accomplished using the matrix completion technique, assuming that the matrix formed by concatenating vectorized well-aligned images has low rank (i.e. image fusion via low rank matrix completion-step 4). Low-rank matrix completion estimates the missing entries of a matrix under the assumption that the matrix to be recovered has low rank. Thus, the cloud-free images may be produced (i.e. cloud-free images-step 5).

According to another embodiment of the present disclosure, a system for image processing. The system including a computer readable memory having a set of stored multi-angled view images of a scene generated by sensors. Each multi-angled view image includes pixels, and at least one multi-angled view image includes a clouded area in at least a portion of the scene, resulting in missing pixels. A processor in communication with the computer readable memory is configured to: align at least three multi-angled view images in the set of multi-angled view images to a target view angle of the scene, to form a set of aligned multi-angled view images representing a target point of view of the scene, such that at least one aligned multi-angled view image of the at least three multi-angled view images, has missing pixels due to the clouded area. Form a matrix using vectorized aligned multi-angled view images, wherein the matrix is incomplete due to the missing pixels. Finally, complete the matrix using a matrix completion to combine the aligned multi-angled view images to produce a fused image of the scene without the clouded area.

According to an embodiment of the present disclosure, a method for image processing of high definition (HD) images of a three dimensional (3D) scene. The method including acquiring, by a processor, a set of multi-angled view HD images of the 3D scene generated by sensors either by an input interface or from a computer readable memory, in communication with the processor, such that each multi-angled view HD image includes pixels, and at least one multi-angled view HD image includes an occluded area in at least a portion of the 3D scene, resulting in missing pixels. Aligning, by the processor, at least three multi-angled view HD images in the set of multi-angled view HD images to a target view angle of the 3D scene, to form a set of aligned multi-angled view HD images representing a target point of view of the 3D scene, such that at least one aligned multi-angled view HD image of the at least three multi-angled view HD images, includes missing pixels due to the occluded area. Forming, by the processor, a matrix using vectorized aligned multi-angled view HD images, such that the matrix is incomplete due to the missing pixels. Finally, completing, by the processor, the matrix using a matrix completion to combine the aligned multi-angled view HD images to produce a fused HD image of the 3D scene without the occluded area.

According to another embodiment of the present disclosure, a non-transitory computer readable storage medium embodied thereon a program executable by a computer for performing a method. The method for image processing of images of a scene. The method including acquiring, by a processor, a set of multi-angled view images of the scene generated by sensors either by an input interface or from a computer readable memory, in communication with the processor, such that each image includes pixels, and at least one image includes an occluded area in at least a portion of the scene, resulting in missing pixels. Aligning, by the processor, at least three images in the set of images to a target view angle of the scene, to form a set of aligned images representing a target point of view of the scene, such that at least one aligned image of the at least three images, includes missing pixels due to the occluded area. Forming, by the processor, a matrix using vectorized aligned images, such that the matrix is incomplete due to the missing pixels. Finally, completing, by the processor, the matrix using a matrix completion to combine the aligned images to produce a fused image of the scene without the occluded area.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A, FIG. 2B and FIG. 2C are pictures illustrating simulation results for synthetic cloud-contaminated images, wherein FIG. 2A illustrates the cloud-free ground truth, FIG. 2B illustrates the synthetic cloud-covered image, and FIG. 2C illustrates the fused image according the systems and methods of the present disclosure, according to embodiments of the present disclosure;

FIG. 3A, FIG. 3B and FIG. 3C are pictures illustrating simulation results for real cloud-contaminated images, wherein FIG. 3A illustrates an original cloud-contaminated image FIG. 3B illustrates the cloud and cloud shadow detected by the present systems and method of the present disclosure, and FIG. 3C illustrates reconstructed results by the systems and methods of the present disclosure, according to embodiments of the present disclosure;

FIG. 4A, FIG. 4B and FIG. 4C are pictures illustrating simulation results for real cloud-contaminated images, wherein FIG. 4A illustrates an original cloud-contaminated image FIG. 4B illustrates the cloud and cloud shadow detected by the present systems and method of the present disclosure, and FIG. 4C illustrates reconstructed results by the systems and methods of the present disclosure, according to embodiments of the present disclosure.

Figure 1A:
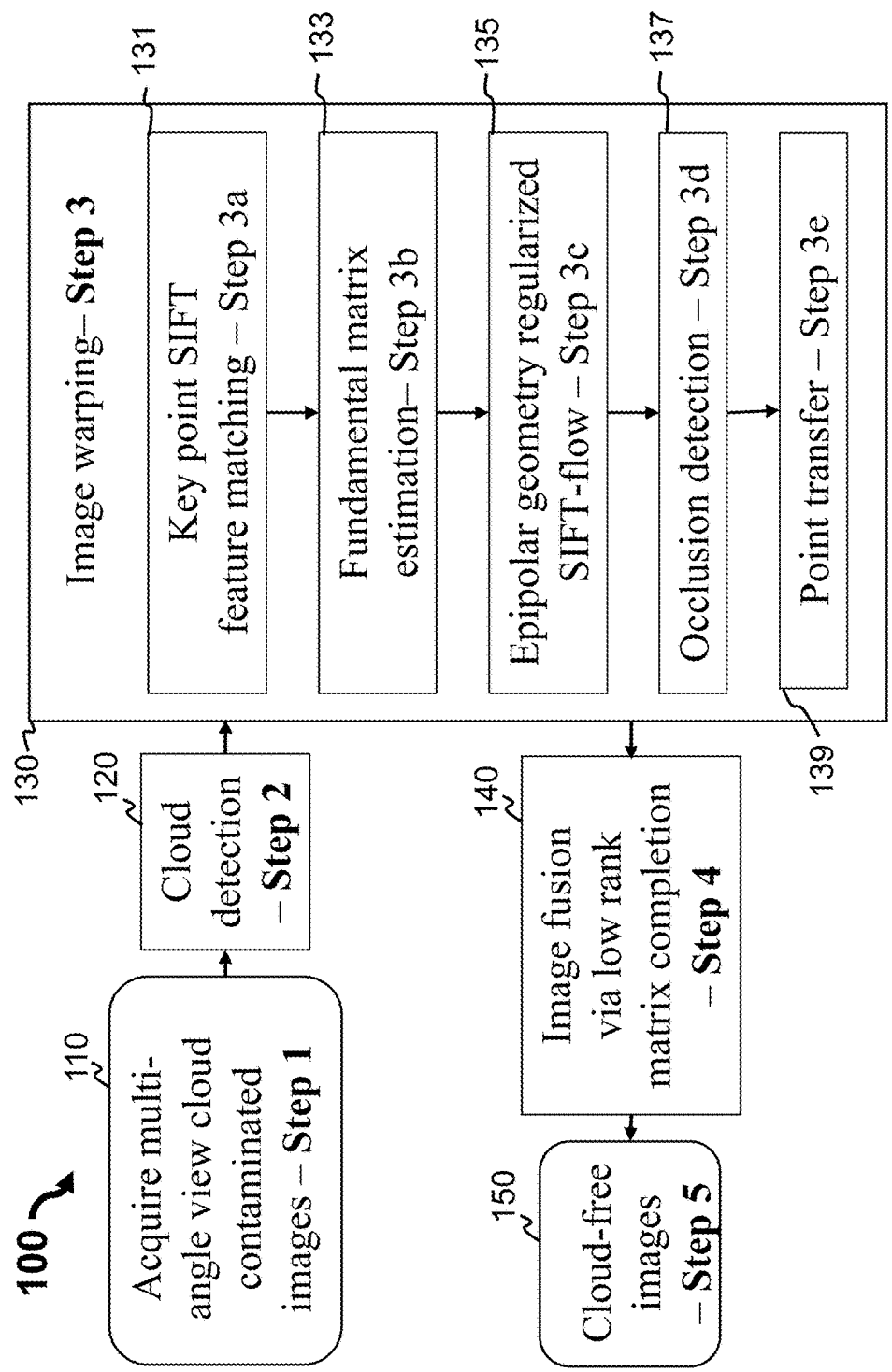
FIG. 1A is a block diagram of a flow chart of a system for enhancing images, in part, an image fusion algorithmic framework for high resolution images with parallax effect, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview of Embodiments of the Present Disclosure

Embodiments of present disclosure are based on an image fusion algorithmic framework for High Definition (HD) images incorporating epipolar geometry and matrix completion techniques. Upon acquiring images of the scene, the acquired images are warped or aligned to a view angle of a target image based on an estimated epipolar geometry. Then, the image fusion process can be formulated as a low-rank matrix completion problem, such that each column of the matrix corresponds to a vectorized warped image and missing entries correspond to cloud or occluded areas to be recovered. Note, clouded areas or cloud contaminated HD aerial images are incomplete images due to areas of cloud-cover blocking the full view of image of the scene by the camera. Further a low-rank matrix completion problem can be used to complete a matrix with missing entries by assuming the matrix has a low rank, which can be solved as a constraint optimization problem.

Specifically, some embodiments the methods and systems include the steps of storing a set of stored multi-angled view images of a scene generated by sensors in a memory. Wherein each multi-angled view image includes pixels, and at least one multi-angled view image includes a clouded area in at least a portion of the scene, resulting in missing pixels. A processor in communication with the memory is configured to: align at least three multi-angled view images in the set of multi-angled view images to a target view angle of the scene, to form a set of aligned multi-angled view images representing a target point of view of the scene, such that at least one aligned multi-angled view image of the at least three multi-angled view images, has missing pixels due to the clouded area. Form a matrix using vectorized aligned multi-angled view images, wherein the matrix is incomplete due to the missing pixels. Finally, complete the matrix using a matrix completion to combine the aligned multi-angled view images to produce a fused image of the scene without the clouded area.

The present disclosure is based on a realization that before fusing the HD images, the cloud-contaminated images need to be aligned (warped) to the same view angle, like all images are taken from the same location. This can be important because the present disclosure avoids the high cost of aerial image acquisition of conventional imaging methods, among other things. The present disclosure fuses multiple cloud-contaminated images from images that are captured at different times, captured from different view angles, or both. Convention image reconstruction methods assume that the acquired cloud-contaminated images are well-aligned and do not take parallax into consideration, even when those images are captured from different view angles. Parallax can be understood as the effect whereby the position or direction of an object appears to differ when viewed from different positions, i.e., through the viewfinder and the lens of a camera.

The present disclosure is also based on another realization that aligning of images taken from different angles can lead to incomplete images. For example, an image taken from behind of a building and aligned to a view from a front of the building will miss some pixels visible only from the front. Further, some pixels will be missed due to cloud contamination of the view. The missing pixels impedes usability of the images in today's applications, such as urban planning and environmental monitoring, among other applications, rendering them unusable or unable to provide a suitable solution. We discovered through experimentation that a slight misalignment will have a significant effect on HD images and leads to significant blurring in HD images. We also learned through experimentation that this is true for urban areas where buildings exhibit different elevations.

We further realized that the matrix formed by the vectorized warped images will be a low rank due to the similarity of at least some pixels in the images. To vectorize the warped images, we put the magnitude value each pixel one by one in a vector. The order of pixels can be row by row, column by column, or any other kind as long as the order is the same across all images. By assuming low rank, rank 2 for example, we may find a small number 2, of independent vectors of images, which can be used to represent all vectors of warped images. The low rank constraint is beneficial in fusing information across all images viewed from different angles. Thus, the missing pixels can be recovered using a low-rank matrix completion method, such that each column of the low-rank matrix completion corresponds to a vectorized aligned multi-angled view image and the missing pixels of the at least one aligned multi-angled view image corresponds to the clouded area. A key aspect, among many, of the present disclosure is recovering a cloud free image using the matrix completion of a matrix formed by vectorized cloud contaminated images warped to the same view angle.

At least three phases are incorporated with embodiment of the present disclosure, which include cloud detection, image warping and image fusion. Of course other phases may be incorporated depending upon the specific application.

FIG. 1A is a block diagram of a flow chart of a system 100 for enhancing images, in part, an image fusion algorithmic framework for high resolution images with parallax effect, according to embodiments of the present disclosure. After acquiring multi-angle view cloud contaminated images 110, then cloud detection can be initiated.

Regarding cloud detection 120, cloud detection 120 can be performed based on the intensity and total variation of small patches, i.e. total variation thresholding.

Image warping 130 can be achieved by key point SIFT feature matching 131, followed by epipolar point transfer. Specifically, the present disclosure may use an approach of estimating fundamental matrices 133, between all pairs of images from the cloud-free areas, and then finds dense correspondence points of all image pairs by applying SIFT-flow constrained to the epipolar geometry of the scene 135. Once a target image, a cloud-contaminated image to be recovered, can be determined 137, all other images are warped to the same view angle of the target image by a point transfer formula 139, such that they are aligned with each other.

Still referring to FIG. 1A, after image warping, we have obtained a collection of images that are warped to align with the target image. The warped images contain missing pixels due to cloud contamination or occlusion. Such that, image fusion can be accomplished using the matrix completion technique, assuming that the matrix formed by concatenating vectorized well-aligned images has low rank 140. Thus, the cloud-free images may be produced 150.

Figure 1B:
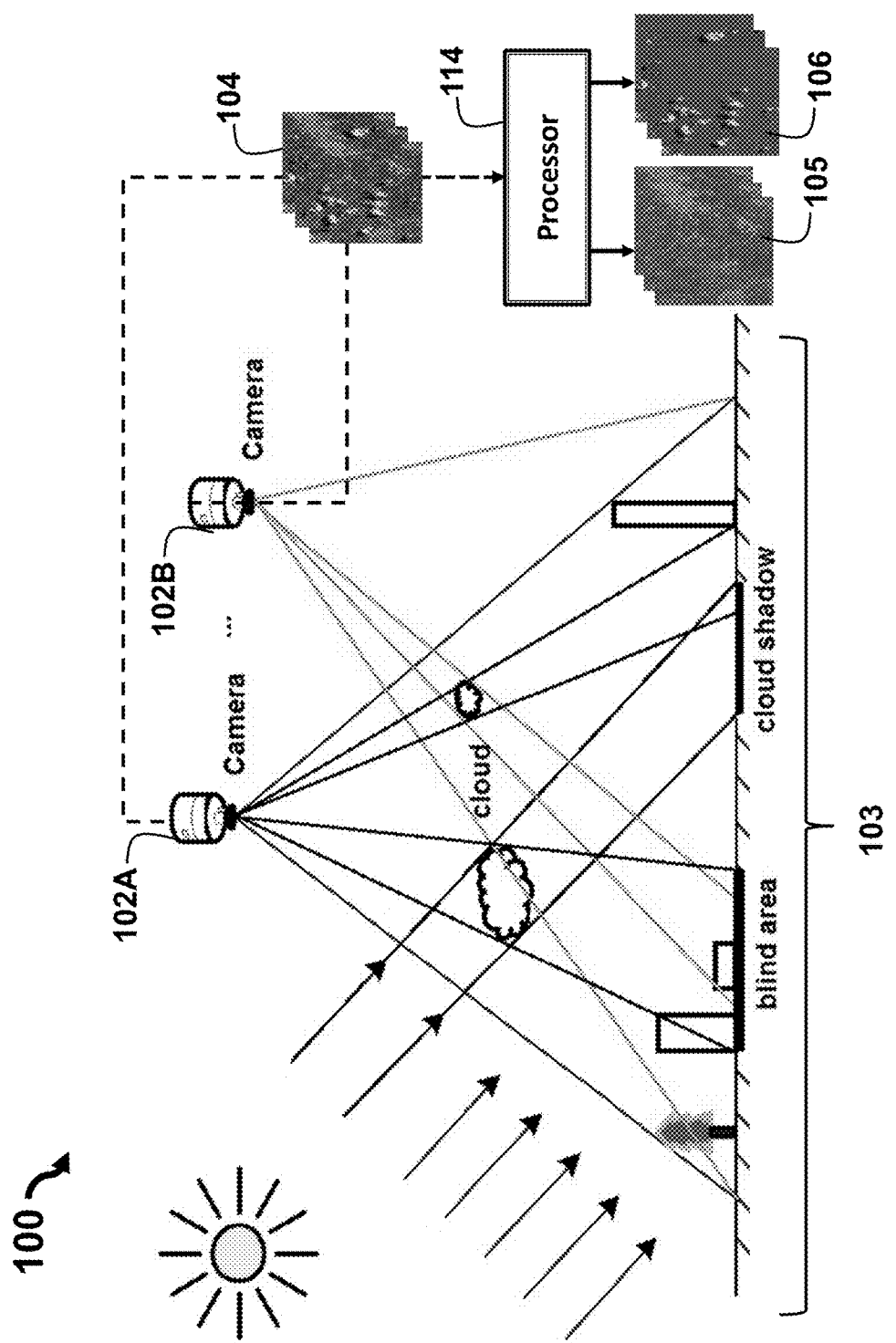
FIG. 1B is a schematic illustrating the system of FIG. 1A that includes the components that may be used, according to embodiments of the present disclosure.

FIG. 1B is a schematic illustrating the system 100 of FIG. 1A that includes the components that may be used, according to embodiments of the present disclosure. Sensors 102A, 102B, i.e., a camera in a satellite, sequentially or non-sequentially, capturing a set of T input images 104 of a scene 103. The cameras 102A, 102B may be in a moving airplane, satellite or some other sensor carrying device allowing pictures to be taken of the scene 103. Further, the number of sensors 102A, 102B are not limited in number, and the number of sensors 102A, 102B may be based upon a specific application. The input images 104 can be obtained by a single moving sensor at time steps t, or by multiple sensors 102A, 102B taken at different times, different angles and different elevations. Sequential acquisition reduces memory requirements to store the images 104, because the input images 104 can be processed online as they are acquired by one or more sensor 102A, 102B and received by a processor 114. The input images 104 can overlap to facilitate registering the images with each other. The input images 104 can be gray scale images or color images. In addition, the input images 104 can be multi-temporal images or multi-angle view images acquired sequentially.

Still referring to FIG. 1B, one or more sensor 102A, 102B can be arranged in a moving space or airborne platform (satellite, airplane or drone), and the scene 103 can be ground terrain or some other scene located on the surface or above the surface of the earth. The scene 103 can include occlusions due to structures in the scene 103, such as buildings, and clouds between the scene 103 and the one or more sensor 102A, 102B. At least one goal of the present disclosure, among other goals, is to produce a set of enhanced output images 105, without occlusions. As a by-product, the system also produces a set of sparse images 106 including just the occlusions, e.g., the clouds.

Figure 1C:
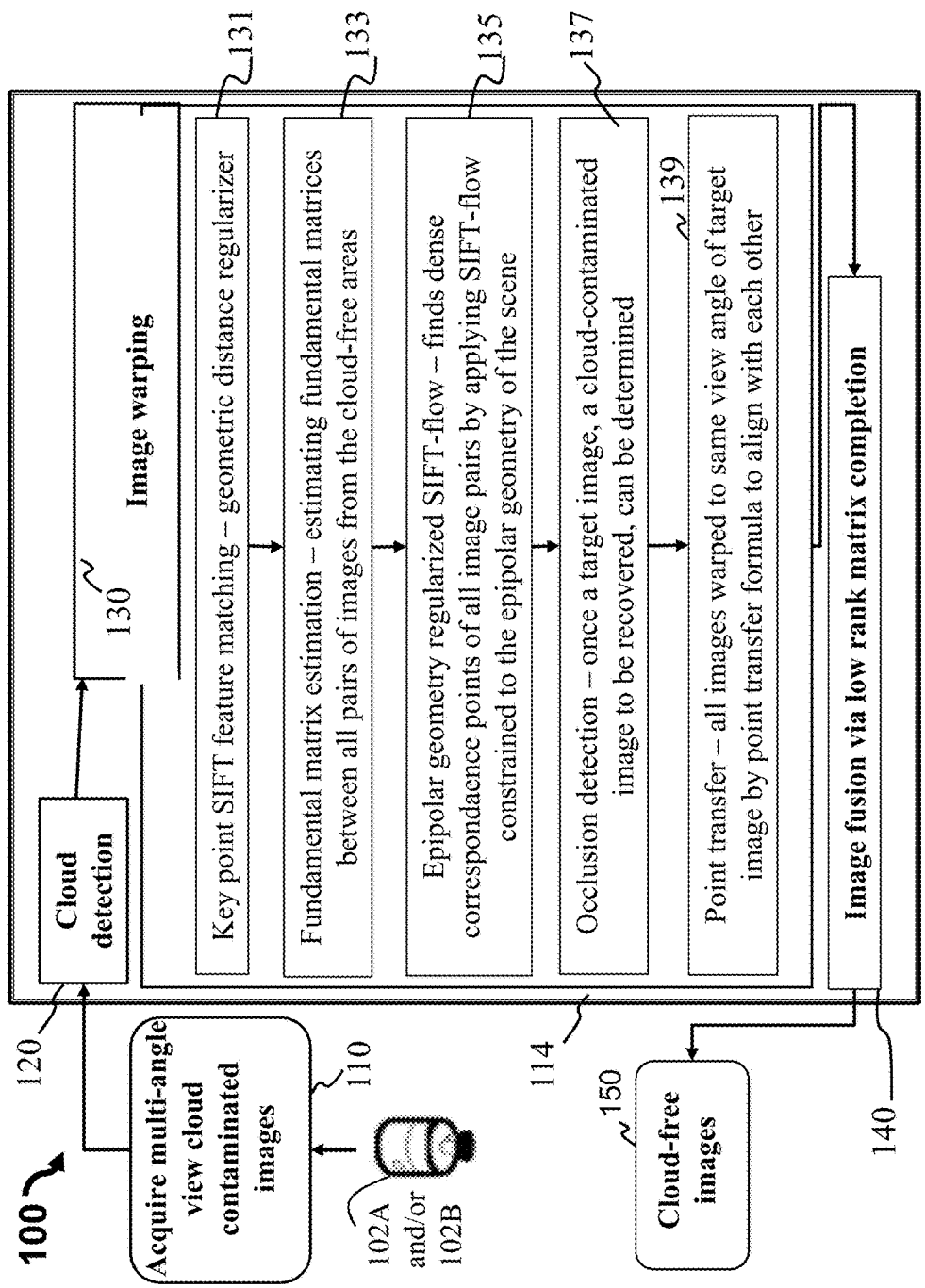
FIG. 1C is a flow diagram of the system of FIG. 1A that provides details of forming a matrix using vectorized aligned multi-angled view images and the matrix completion, according to embodiments of the present disclosure.

FIG. 1C is a flow diagram of the system of FIG. 1A that provides details of forming a matrix using vectorized aligned multi-angled view images and the matrix completion, according to embodiments of the present disclosure. As shown in FIG. 1C, the system operates in a processor 114, which can be connected to the sensors 102A, 102B, either electrically or wirelessly.

The set of input images 104 of FIG. 1B are acquired 110 of FIG. 1C by the processor 114 either directly or indirectly, e.g., the image can be acquired 110 by sensors 102A, 102B, i.e. a camera, a video camera, or can be obtained by other means or from other sources, e.g., a memory transfer, or wireless or wireless communication. It is possible, a user interface in communication with the processor and the computer readable memory, can acquire and store the set of multi-angled view images in the computer readable memory upon receiving an input from a surface of the user interface by a user.

Still referring to FIG. 1C, cloud detection 120 can be performed based on the intensity and total variation of small patches, i.e. total variation thresholding. Specifically, by dividing an image into patches, and computing an average intensity and total variation of each patch. Such that each patch can be labeled as cloud, or cloud shadow, under specific conditions. Wherein, the detected regions with a small area can be then removed from the cloud mask, since they are likely to be other flat objects such as building surfaces or shadows of buildings. Finally, the cloud mask can be dilated so that the boundary of the cloud-covered areas with thin clouds are also covered by the cloud mask.

Aligning of the multi-angled view images to the target view angle of the scene forms the set of aligned multi-angled view images representing the target point of view of the scene that can be based on a fundamental matrix. Wherein the fundamental matrix is estimated by key points in the multi-angled images and the key points are based on SIFT Matching. For example, image warping 130 can be achieved by key point SIFT feature matching 131, i.e. SIFT-flow with a geometric distance regularizer, followed by epipolar point transfer. In particular, the present disclosure may use an approach of estimating fundamental matrices 133, between all pairs of images from the cloud-free areas, and then finds dense correspondence points of all image pairs by applying SIFT-flow constrained to the epipolar geometry of the scene 135, such that the fundamental matrix is estimated by key points in the multi-angled images. Further, it is contemplated that an iterative process including more images can improve the fused image that meets a threshold such that the selected image is high correlated to the image to be recovered.

Still referring to FIG. 1C, once a target image, a cloud-contaminated image to be recovered, can be determined 137, all other images are warped to the same view angle of the target image by a point transfer formula 139, such that they are aligned with each other.

After image warping, we have obtained a collection of images that are warped to align with the target image. The warped images contain missing pixels due to cloud contamination or occlusion. Such that, image fusion can be accomplished using the matrix completion technique, assuming that the matrix formed by concatenating vectorized well-aligned images has low rank 140. Low-rank matrix completion estimates the missing entries of a matrix under the assumption that the matrix to be recovered has low rank. Since direct rank minimization is computationally intractable, convex or nonconvex, relaxation can be usually used to reformulate the problem. Thus, the cloud-free images may be produced 150.

We have further defined each phase of the at least three phases of the present disclosure cloud detection, image warping, and image fusion, below. As noted above, cloud detection can be performed based on the intensity and total variation of small patches. Also as noted above, image warping can be achieved by SIFT-flow with a geometric distance regularizer, followed by epipolar point transfer, also noted above. Image fusion uses the matrix completion technique, assuming that the matrix formed by concatenating vectorized well-aligned images has low rank. Below we have further explained each phase in detail. Nonetheless, it is possible other phases may be incorporated into the present disclosure depending upon the specific application.

Cloud Detection

While advanced cloud detection approaches might be applied to our framework to obtain highly accurate cloud masks, we use a simple approach that is based on intensity and total variation thresholding in this paper, since a slight loss of accuracy in cloud detection does not significantly affect the final reconstruction quality in our framework.

Specifically, we divide an image into patches, and compute the average intensity $\bar{I}(P)$ and total variation $TV(P)$ of each patch P. A patch is labeled as cloud (resp. cloud shadow) if $\bar{I}(P) > \lambda_{Ic}$ (resp. $\bar{I}(P) < \lambda_{Is}$) and $TV(P) < \lambda_{TV}$, for some $\lambda_{Ic} > 0$, $\lambda_{Is} > 0$, and $\lambda_{TV} > 0$. Detected regions with small area are then removed from the cloud mask, since they are likely to be other flat objects such as building surfaces or shadows of buildings. Finally, the mask is dilated so that the boundary of the cloud-covered areas with thin clouds are also covered by the mask.

Image Warping

Since the affine camera model is insufficient to capture the parallax in our dataset, there is no 2D homography that can warp one image to align with another. Our strategy is to estimate the fundamental matrices between all pairs of images from the cloud-free areas, and then find dense correspondence points of all image pairs by applying SIFT-flow constrained to the epipolar geometry of the scene. Once a target image, a cloud-contaminated image to be recovered, is determined, all other images are warped to the same view angle of the target image by the point transfer formula (1) such that they are aligned with each other.

Basics of Epipolar Geometry

We provide a brief summary of some basic results in epipolar geometry that will be used in our algorithm; readers are referred to Hartley and Zisserman for detailed explanation and derivation. Consider an example of three images, and let $x = (x_1, x_2, x_3)^T$, $x' = (x_{1'}, x_{2'}, x_{3'})^T$, and $x'' = (x_{1''}, x_{2''}, x_{3''})^T$ be the homogeneous coordinates of the first, second, and third images, respectively. Denote the fundamental matrix of the first and second images by $F_{21} \in R^{3 \times 3}$, where it satisfies that $x'^T F_{21} x = 0$ if $x \leftrightarrow x'$ is a pair of correspondence points. A line $\{(x_1, x_2) | ax_1 + bx_2 + c = 0\}$ is denoted by $l = (a, b, c)^T$. A point x is on line l if and only if $x^T l = 0$. A point x at the intersection of two lines $l_1$ and $l_2$ satisfies $x = l_1 \times l_2$, where × denotes vector cross product.

Suppose that $x \leftrightarrow x' \leftrightarrow x''$ are correspondence points. Hence, $x'' F_{31} x = 0$ and $x'' F_{32} x' = 0$. That is, $x''$ is at the intersection of two lines $l = F_{31} x$ and $l' = F_{32} x'$, which are called epipolar lines corresponding to points x and x', respectively. Therefore, point transfer via fundamental matrices is formulated as $$x'' = (F_{31} x) \times (F_{32} x'). \quad (1)$$

Key Point SIFT Matching

SIFT-flow is an algorithm that finds the optimal displacement of the pixels in the second image, so that it is close to the first image in the sense that an energy function (2) is minimized. In particular, let $x = (x_1, x_2)$ and $x' = (x_{1'}, x_{2'})$ now denote the inhomogeneous coordinates of the first and second images, respectively, and $w^x = (w_1^x, w_2^x)$ denote the displacement of the pixel at location x in the second image. Let $s_1(x)$ be the SIFT feature vector at x in the first image, and $s_2(x+w^x)$ be the SIFT feature vector at $x' = x + w^x$ in the second image. The energy function to be minimized is defined as $$E(\{w^x\}) = \sum_x \|s_1(x) - s_2(x+w^x)\|_1 + \gamma \sum_x \|w^x\|_2^2 + \quad (2)$$
$$\sum_{(x,u) \in N} \min(\alpha |w_1^x - w_1^u|, d) + \min(\alpha |w_2^x - w_2^u|, d),$$

where α, d, and γ are non-negative tuning parameters, and N denotes a collection of all 4-connected neighborhoods in the image. The first term in (2) measures the difference in SIFT feature, the second term penalizes large movements, and the third term promotes similar displacement of neighboring pixels. The minimization of (2) over $\{w^x\}$ is performed by discrete state space max-sum belief propagation (BP). Several techniques, such as distance transform and multi-level propagation, are utilized in SIFT-flow to accelerate BP.

Epipolar Geometry Regularized SIFT-Flow

The flow $\{w^x\}$ that minimizes (2) can warp the second image such that it is visually similar to the first image. However, it does not guarantee that the pixel at x in the first image and the pixel at $x' = x + w^x$ in the second image correspond to a common point in the 3D scene, even though their SIFT features might be similar. In our framework, the goal is to find correspondence points $\{x \leftrightarrow x + w^x\}$ that satisfy the epipolar geometry. To this end, we add an extra term to the energy function (2) to penalize the Sampson distance, which is the first-order approximation to the geometric error. The modified energy function is $$E(\{w^x\}) = \sum_x \|s_1(x) - s_2(x+w^x)\|_1 + \gamma \sum_x \|w^x\|_2^2 + \quad (3)$$
$$\sum_{(x,u) \in N} \min(\alpha |w_1^x - w_1^u|, d) + \min(\alpha |w_2^x - w_2^u|, d) +$$

$$\sum_{x} \frac{\beta((x+w^x)^T F_{21} x)^2}{[F_{21}x]_1^2 + [F_{21}x]_2^2 + [F_{21}^T(x+w^x)]_1^2 + [F_{21}^T(x+w^x)]_2^2},$$

where $[\cdot]_i$ denotes the ith element of a vector, $\beta$ is a non-negative tuning parameter, $F_{21}$ is the fundamental matrix of the two images, and the last term is the Sampson distance. Note that the Sampson distance is zero if and only if $x \leftrightarrow x+w^x$ is a pair of correspondence points that satisfies the estimated epipolar geometry, i.e., $(x+w^x)^T F_{21} x = 0$.

To estimate the fundamental matrix $F_{21}$, we acquire the initial correspondence points for each image pair by matching the SIFT features at the key points detected by the SIFT detector. The fundamental matrix is then estimated from the set of initial correspondence points using the RANSAC robust estimation scheme. Following the original SIFT-flow, the accelerated belief propagation algorithm is used to minimize the new energy function (3).

Considering that occlusion effects may lead to incorrect correspondence points, we verify correspondence points with two flows for each pair of images, one is from the first image to the second image, and the other is from the second to the first. A correspondence point set is verified if both points in it return to themselves according to the two flows. Otherwise, it is treated as an occlusion point.

Point Transfer

Given a cloud-contaminated target image, we warp all other images to align with the target image using the point transfer formula (1), where x and x' are correspondence points estimated by epipolar geometry regularized SIFT-flow (3). More specifically, let $I_1(x)$ and $I_2(x')$ denote the intensity of the first image at x and that of the second image at x', respectively. Suppose that the target image is the third image, and its coordinate is denoted by x". If $x \leftrightarrow x'$ is a pair of correspondence points, and $x'' = F_{31} x \times F_{32} x'$, then $x \leftrightarrow x' \leftrightarrow x''$ are correspondence points according the epipolar geometry defined by the fundamental matrices $F_{31}$ and $F_{32}$. Therefore, we have that $\hat{I}_1(x'') = I_1(x)$ and $\hat{I}_2(x'') = I_2(x')$, where $\hat{I}_1$ and $\hat{I}_2$ are the first and second images warped to align with the target image, respectively.

Image Fusion

After image warping, we have obtained a collection of images that are warped to align with the target image. The warped images contain missing pixels due to cloud contamination or occlusion. Notice that each pair of images generates two warped images, hence, we have warped images in total, where N is the number of images in the dataset and −1 is for excluding the target image. To improve the fusion performance, we select a subset of the warped images that are potentially of high quality in terms of correlation coefficient between a warped image and the dominant eigen image $\hat{I}_0$ of all warped images. A warped image is selected if its mutual correlation coefficient with $\hat{I}_0$ is higher than a preset threshold.

Low-rank matrix completion estimates the missing entries of a matrix under the assumption that the matrix to be recovered has low rank. Since direct rank minimization is computationally intractable, convex or nonconvex relaxation is usually used to reformulate the problem. The tightest convex relaxation of rank minimization is nuclear norm minimization, which is formulated as $$\min \|X\|, \text{ subject to } X_\Omega = Y_\Omega. \quad (4)$$

where $\Omega$ is the set of indices of visible entries, Y is the observed incomplete matrix, and $\|\cdot\|_*$ denotes the nuclear norm. Problem (4) can be efficiently solved by a class of singular value thresholding (SVT) algorithms, which iteratively evaluate a proximal operator of the nuclear norm. Given the singular value decomposition $G = UDV^T$, the proximal operator on G is defined as, $$\text{prox}_{\lambda\|\cdot\|}(G) = US_\lambda(D)V^T. \quad (5)$$

where the entries of $S_\lambda(D)$ are given by $$[S_\lambda(D)]_{ij} = \begin{cases} D_{ij} - \lambda, & \text{if } D_{ij} > \lambda \\ 0, & \text{otherwise} \end{cases}. \quad (6)$$

We consider the accelerated proximal gradient (APG) algorithm to perform matrix completion by solving a nuclear norm regularized least squares problem $$\min_X \frac{1}{2} \|A(X) - b\|_2^2 + \mu \|X\|_*, \quad (7)$$

where A is a linear operator, b is a vector of observations, and $\mu > 0$ is a tuning parameter. The APG algorithm, which is an extension of fast iterative shrinkage and thresholding (FISTA) to the matrix setting, iterates according to $$Y^k = X^k + \frac{t^{k-1} - 1}{t^k}(X^k - X^{k-1}) \quad (8)$$

$$G^k = Y^k - (\tau)^{-1} A^*(A(Y^k) - b) \quad (9)$$

$$X^{k+1} = \text{prox}_{\mu/\tau\|\cdot\|_*}(G^k) \quad (10)$$

$$t^{k+1} = \frac{1 + \sqrt{1 + 4(t^k)^2}}{2}, \quad (11)$$

where $k \geq 1$ is the iteration index, the initialization follows $t^0 = 1$ and $X^0 = X^1 = 0$, $\tau \geq L_A$ (the Liptchitz constant of the operator A), and $\text{prox}_{\mu/\|\cdot\|}$ is the proximal operator defined in (5).

In the matrix completion problem, the linear operator A is the selection operator, which is defined as $A(X) = \text{vec}(X_\Omega)$ and $b = \text{vec}(Y_\Omega)$. The adjoint $A^*$ puts the elements of the vector back into the matrix form and fills the entries in $\Omega^C$, the complement of $\Omega$, with zeros. The smallest Liptchitz constant $L_A$ of A is 1, since $\|A(X)\|_2 \leq 1 \cdot \|X\|_F$, where equality holds if and only if A selects all the nonzero entries in X.

Simulation results for synthetic cloud-contaminated images: (a) the cloud-free ground truth; (b) synthetic cloud-covered image; (c) fused image by our algorithm. (d) fused result by online tensor robust PCA. (e) one of the images used for image fusion.

Simulation results for real cloud contaminated images. Each row corresponds a set of testing images. Columns from the left to the right show examples of (a) the original cloud-contaminated images; (b) cloud and cloud shadow detected by our algorithm; (c) reconstructed results by our algorithm; (d) reconstructed results by online tensor robust PCA; and (e) one of the images that are used for image fusion.

Numerical Results

Our dataset is a collection of 13 multi-angle view DigitalGlobe HD images of a common urban scene, each of size 14178×14178. The images are roughly aligned according to the objects close to the ground. Three sets of images are cropped from the original images for testing, where each set is a collection of 13 images of size 1024×1024 that are roughly aligned according to the ground. In our experiments, the intensity of the images are normalized to be in [0,1]. We set parameters for cloud detection as $\lambda_{\hat{I}c}$=0.45, $\lambda_{\hat{I}s}$=0.2, and $\lambda_{TV}$=0.04, and parameters in (3) as $\alpha$=30, d=300, $\gamma$=0.01, and $\beta$=10. We compare the reconstruction results of our algorithm to the results of the online tensor robust PCA algorithm.

Synthetic Cloud-Contaminated Images

Figure 2C:
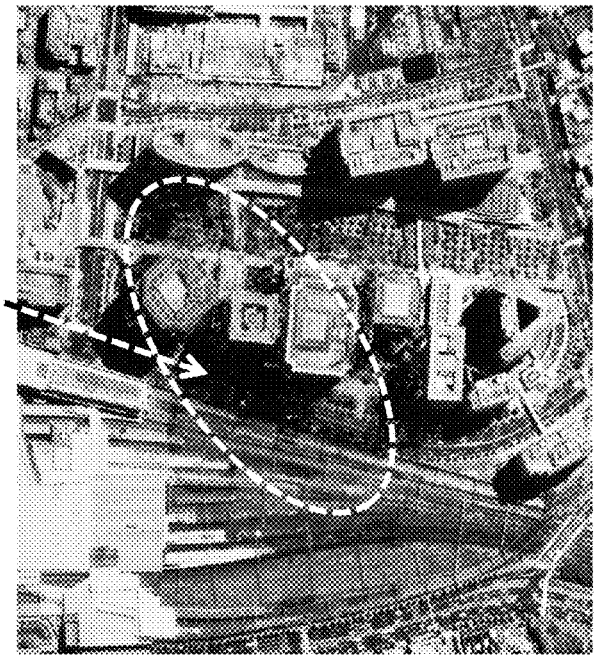
Figure 2A:
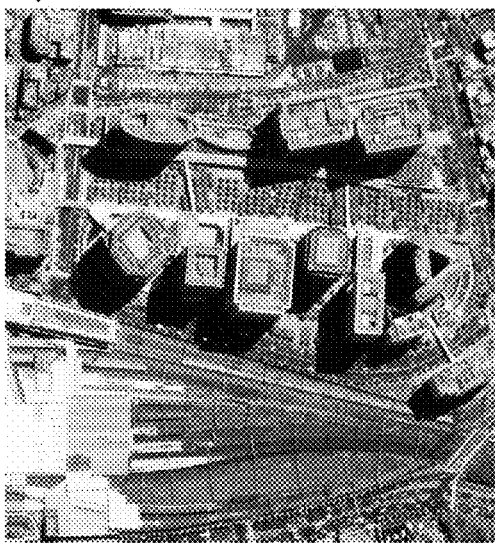
Figure 2B:
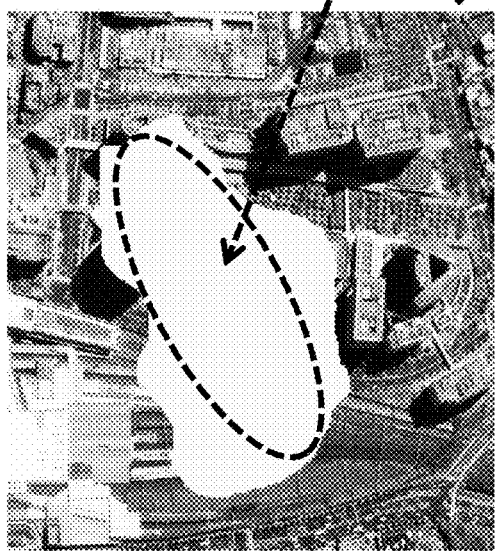

FIG. 2A, FIG. 2B and FIG. 2C are pictures illustrating simulation results for synthetic cloud-contaminated images, wherein FIG. 2A illustrates the cloud-free ground truth, FIG. 2B illustrates the synthetic cloud-covered image, and FIG. 2C illustrates the fused image according the systems and methods of the present disclosure, according to embodiments of the present disclosure.

Specifically, FIGS. 2A-2C are a sequence of pictures illustrating the implementation of the present disclosure that correctly reconstructs objects within the scene that are covered by clouds. FIG. 2A is a picture that is a cloud-free image representing the scene as the target image, which serves as the ground-truth. FIG. 2B is a synthetic cloud-covered image that is then the input of the testing algorithms of the present disclosure. Wherein the cloud-covered area 204 is represented as white space that is indicated as a dotted circle. FIG. 2C illustrates the reconstruction result after applying the method of the present disclosure. Upon comparing the reconstruction result of FIG. 2C to that of the ground-truth of FIG. 2A, we can see that our algorithm has correctly located all the buildings and produced a visually plausible image Referring to FIGS. 2A-2C, we observe that the objects that are close to the ground are less blurred than those with higher altitude. At least one reason this can be explained is by comparing FIGS. 2A and 2C, where we can see that the objects that are close to the ground are roughly aligned, whereas there is a significant movement of the building tops.

Real Cloud-Contaminated Images

Figure 3C:
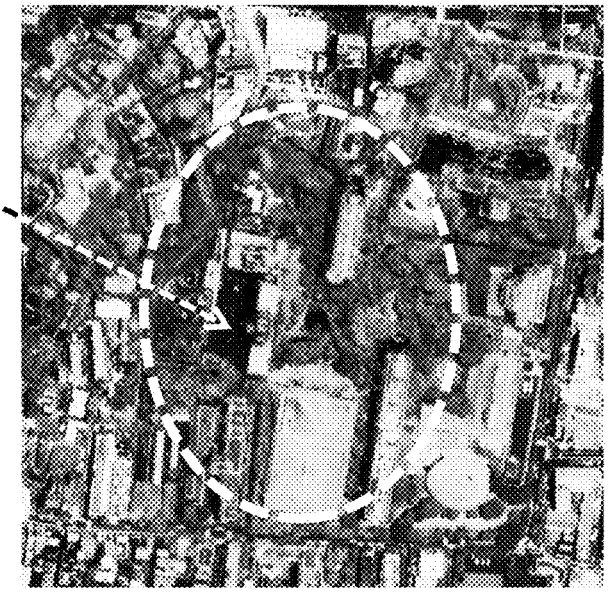
Figure 3A:
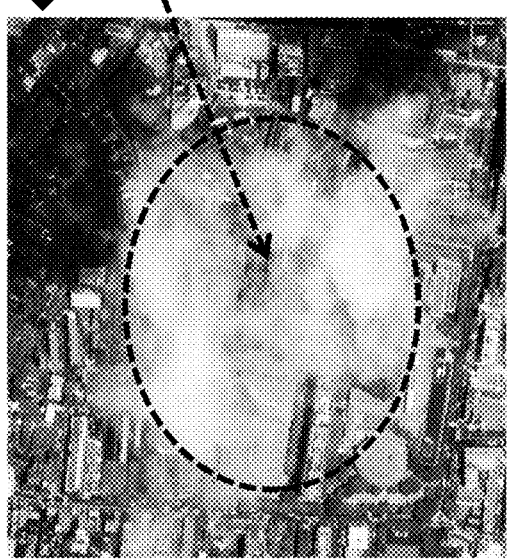
Figure 3B:
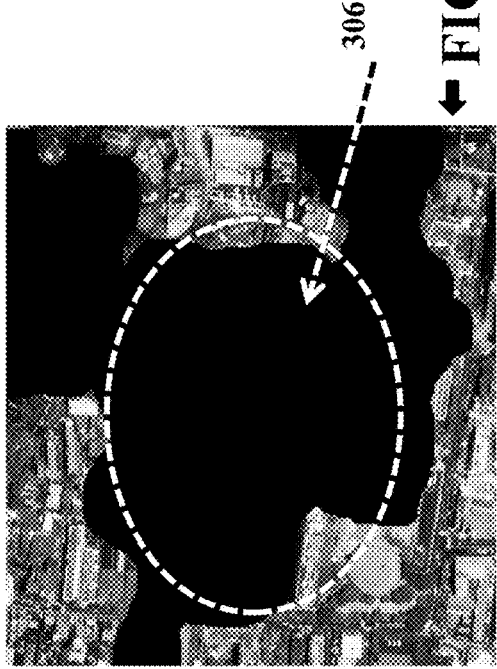

FIG. 3A, FIG. 3B and FIG. 3C are pictures illustrating simulation results for real cloud-contaminated images, wherein FIG. 3A illustrates an original cloud-contaminated image FIG. 3B illustrates the cloud and cloud shadow detected by the present systems and method of the present disclosure, and FIG. 3C illustrates reconstructed results by the systems and methods of the present disclosure, according to embodiments of the present disclosure.

FIG. 4A, FIG. 4B and FIG. 4C are pictures illustrating simulation results for real cloud-contaminated images, wherein FIG. 4A illustrates an original cloud-contaminated image FIG. 4B illustrates the cloud and cloud shadow detected by the present systems and method of the present disclosure, and FIG. 4C illustrates reconstructed results by the systems and methods of the present disclosure, according to embodiments of the present disclosure FIG. 3A and FIG. 4A show examples of original cloud-contaminated images, i.e. for FIG. 3A see the white cloud labeled with a dotted circle having a character reference number 304, and for FIG. 4A see the white cloud labeled with a dotted circle having a character reference number 404.

FIG. 3B and FIG. 4B show the cloud detection results based on the present disclosure, where the clouds for both FIG. 3B and FIG. 4B are marked with black areas that are indicated by a white dotted circle having character reference number 306.

FIG. 3C and FIG. 4C illustrate the results using the method of the present disclosure, wherein it is clear that the method of the present disclosure convincingly provides for a cloud-free image of the scene. At least one reason, among many reasons, is at least due for matrix completion, wherein the coordinates of missing pixels are more accurately detected, by the cloud and shadow detection process.

According to the embodiments of the present disclosure, the systems and methods provide for an image fusion algorithmic framework that recovers the cloud-contaminated areas in a collection of multi-angle view HD images. For example, the present disclosure framework first warps images viewed from different angles to the same view angle of the target image using epipolar geometry regularized SIFT-flow followed by point transfer, then fuses the missing pixels of contaminated areas or occluded areas using a low-rank matrix completion method. Numerical results on cloud contaminated HD images demonstrated that the systems and methods of the present disclosure significantly improve the performance in fusing HD multi-angle view images.

Other Image Processing Applications

The present disclosure can also be used for other applications. In the case of background subtraction, also known as foreground detection, a foreground of an image is extracted for further processing such as object detection and recognition, e.g., pedestrians, vehicles, etc. Background subtraction can be used for detecting moving objects in a sequence of images (video). Background subtraction provides important cues for numerous applications in computer vision, for example surveillance tracking or human poses estimation.

Another embodiment of the present disclosure includes a camera, comprising: a sensor for acquiring an image of a scene; a memory for storing a set of multi-angled images of the scene acquired from different angles, wherein at least some images include a cloud occluding at least a portion of the scene; and a processor for warping the multi-angled images to the same view angle and for fusing the warped images into a cloud-free image. It is contemplated another embodiment of the present disclosure may include a camera comprising: a sensor for acquiring an image of a scene; a memory for storing a set of multi-angled images of the scene acquired by the sensor from different angles, wherein at least some images include a cloud occluding at least a portion of the scene; and a processor for warping at least some of the images in the set to the same view angle, wherein the warped images include missing pixels, i.e. no values, forming a matrix using vectorized warped images, wherein the matrix is incomplete due to the missing pixels; and completing the matrix using a matrix completion method to produce an image of the scene without the cloud coverage.

Figure 5:
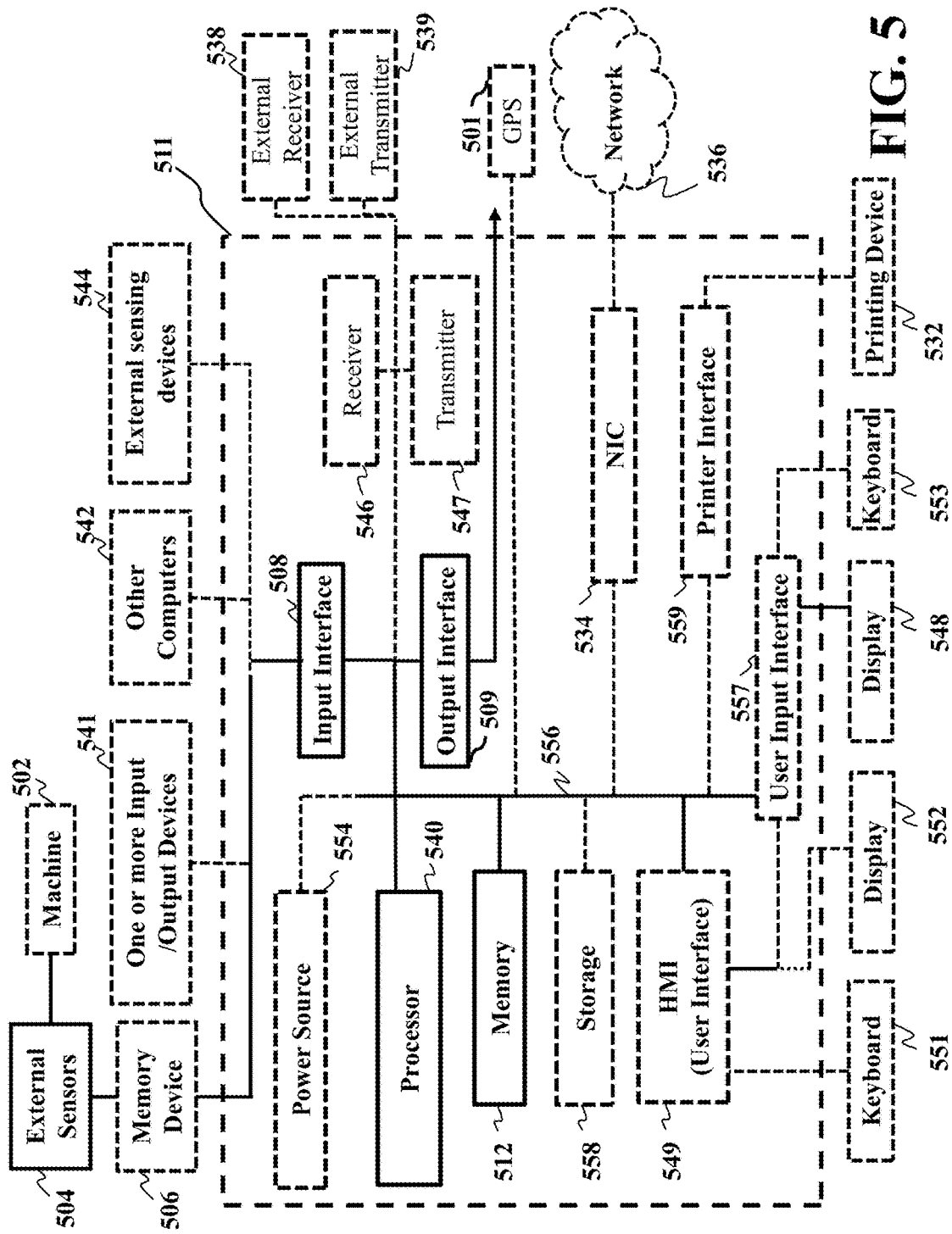
FIG. 5 is a block diagram of illustrating the method of FIG. 1A, that can be implemented using an alternate computer or processor, according to embodiments of the present disclosure.

FIG. 5 is a block diagram of illustrating the method of FIG. 1A, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 564 in communication with the processor 540 and the computer readable memory 512, acquires and stores the image data in the computer readable memory 512 upon receiving an input from a surface, keyboard 553, of the user interface 557 by a user.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein image data or other data, among other things, can be rendered on a third party display device, third party imaging device, and/or third party printing device outside of the computer 511.

Still referring to FIG. 5, the image data or other data, among other things, can be transmitted over a communication channel of the network 536, and/or stored within the storage system 558 for storage and/or further processing. Further, the time series data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. For example, the external sensing devices 544 may include sensors gathering data before-during-after of the collected time-series data of the machine. The computer 511 may be connected to other external computers 542. An output interface 509 may be used to output the processed data from the processor 540. It is noted that a user interface 549 in communication with the processor 540 and the non-transitory computer readable storage medium 512, acquires and stores the region data in the non-transitory computer readable storage medium 512 upon receiving an input from a surface 552 of the user interface 549 by a user.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for image processing, comprising:
a computer readable memory includes a set of stored multi-angled view images of a scene generated by sensors, such that each multi-angled view image includes pixels, and at least one multi-angled view image includes a clouded area in at least a portion of the scene, resulting in missing pixels;
a processor in communication with the computer readable memory is configured to:
align at least three multi-angled view images in the set of multi-angled view images to a target view angle of the scene, to form a set of aligned multi-angled view images representing a target point of view of the scene, such that at least one aligned multi-angled view image of the at least three multi-angled view images, has missing pixels due to the clouded area,
form a matrix using vectorized aligned multi-angled view images, wherein the matrix is incomplete due to the missing pixels, and
complete the matrix using a matrix completion to combine the aligned multi-angled view images to produce a fused image of the scene without the clouded area.

2. The system according to claim 1, wherein the set of multi-angled view images are of a three dimensional (3D) scene and each multi-angled view image of the set of multi-angled view images are one of taken at a same time, a different time, or some combination thereof, of the 3D scene with unknown sensors positions relative to the 3D scene.

3. The system according to claim 2, wherein the aligning of the at least three multi-angled view images to the target point of view of the 3D scene is based on an epipolar geometry of the 3D scene.

4. The system according to claim 1, wherein the matrix completion is a low-rank matrix completion, such that each column of the low-rank matrix completion corresponds to a vectorized aligned multi-angled view image and the missing pixels of the at least one aligned multi-angled view image corresponds to the clouded area.

5. The system according to claim 1, wherein the sensors are moving.

6. The system according to claim 1, wherein the sensors are arranged in a satellite or an airplane.

7. The system according to claim 1, wherein the scene includes occlusions or the clouded area caused by clouds between the sensors and scene and structures in the scene.

8. The system according to claim 1, wherein the aligning of the multi-angled view images to the target view angle of the scene forms the set of aligned multi-angled view images representing the target point of view of the scene is based on a fundamental matrix.

9. The system according to claim 8, wherein the fundamental matrix is estimated by key points in the multi-angled images.

10. The system according to claim 9, wherein the key points are based on SIFT Matching.

11. The system according to claim 9, wherein an iterative process including more images improves the fused image that meets a threshold such that the selected image is high correlated to the image to be recovered.

12. The system according to claim 1, wherein a user interface in communication with the processor and the computer readable memory, acquires and stores the set of multi-angled view images in the computer readable memory upon receiving an input from a surface of the user interface by a user.

13. A method for image processing of high definition (HD) images of a three dimensional (3D) scene, comprising:
acquiring, by a processor, a set of multi-angled view HD images of the 3D scene generated by sensors either by an input interface or from a computer readable memory, in communication with the processor, such that each multi-angled view HD image includes pixels, and at least one multi-angled view HD image includes an occluded area in at least a portion of the 3D scene, resulting in missing pixels;
aligning, by the processor, at least three multi-angled view HD images in the set of multi-angled view HD images to a target view angle of the 3D scene, to form a set of aligned multi-angled view HD images representing a target point of view of the 3D scene, such that at least one aligned multi-angled view HD image of the at least three multi-angled view HD images, includes missing pixels due to the occluded area,
forming, by the processor, a matrix using vectorized aligned multi-angled view HD images, such that the matrix is incomplete due to the missing pixels; and
completing, by the processor, the matrix using a matrix completion to combine the aligned multi-angled view HD images to produce a fused HD image of the 3D scene without the occluded area.

14. The method according to claim 13, wherein the aligning of the at least three multi-angled view images to the target point of view of the 3D scene is based on an epipolar geometry of the 3D scene.

15. The method according to claim 13, wherein the matrix completion is a low-rank matrix completion, such that each column of the low-rank matrix completion corresponds to a vectorized aligned multi-angled view image and the missing pixels of the at least one aligned multi-angled view image corresponds to the clouded area.

16. The method according to claim 13, wherein the sensors are moving and arranged in a satellite or an airplane.

17. A non-transitory computer readable storage medium embodied thereon a program executable by a computer for performing a method, the method for image processing of images of a scene, comprising:
acquiring, by a processor, a set of multi-angled view images of the scene generated by sensors either by an input interface or from a computer readable memory, in communication with the processor, such that each image includes pixels, and at least one image includes an occluded area in at least a portion of the scene, resulting in missing pixels;
aligning, by the processor, at least three images in the set of images to a target view angle of the scene, to form a set of aligned images representing a target point of view of the scene, such that at least one aligned image of the at least three images, includes missing pixels due to the occluded area,
forming, by the processor, a matrix using vectorized aligned images, such that the matrix is incomplete due to the missing pixels; and
completing, by the processor, the matrix using a matrix completion to combine the aligned images to produce a fused image of the scene without the occluded area.

18. The method according to claim 17, wherein the scene includes occlusions or the clouded area caused by clouds between the sensors and scene and structures in the scene.

19. The method according to claim 17, wherein the aligning of the multi-angled view images to the target view angle of the scene forms the set of aligned multi-angled view images representing the target point of view of the scene is based on a fundamental matrix.

20. The method according to claim 19, wherein the fundamental matrix is estimated by key points in the multi-angled images, and the key points are based on SIFT Matching.

* * * * *